(12) United States Patent
Yoshii et al.

(10) Patent No.: US 10,509,944 B2
(45) Date of Patent: Dec. 17, 2019

(54) METHOD AND DEVICE FOR RECOGNIZING FINGERPRINT

(71) Applicant: SAMSUNG DISPLAY CO., LTD., Yongin-si, Gyeonggi-do (KR)

(72) Inventors: Katsumasa Yoshii, Suwon-si (KR); Il Nam Kim, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 163 days.

(21) Appl. No.: 15/866,202

(22) Filed: Jan. 9, 2018

(65) Prior Publication Data
US 2018/0247098 A1 Aug. 30, 2018

(30) Foreign Application Priority Data

Feb. 24, 2017 (KR) .................. 10-2017-0024883

(51) Int. Cl.
G06K 9/00 (2006.01)
G06F 21/32 (2013.01)
G06K 9/62 (2006.01)
G06K 9/68 (2006.01)

(52) U.S. Cl.
CPC ............ G06K 9/001 (2013.01); G06F 21/32 (2013.01); G06K 9/0008 (2013.01); G06K 9/00013 (2013.01); G06K 9/6203 (2013.01); G06K 9/68 (2013.01)

(58) Field of Classification Search
CPC ........ G06K 9/001; G06K 9/0008; G06K 9/68; G06K 9/00013; G06K 9/6203; G06F 21/32
See application file for complete search history.

(56) References Cited

U.S. PATENT DOCUMENTS

| 6,707,934 | B1 * | 3/2004 | Takeda | G06K 9/00087 356/71 |
| 2010/0046810 | A1 * | 2/2010 | Yamada | G06K 9/00026 382/124 |
| 2010/0332487 | A1 * | 12/2010 | Monden | G06K 9/00087 707/758 |
| 2013/0028488 | A1 * | 1/2013 | Abe | G06K 9/0008 382/115 |
| 2014/0294259 | A1 * | 10/2014 | Lee | G06K 9/00013 382/124 |

(Continued)

FOREIGN PATENT DOCUMENTS

| JP | 2833313 B2 | 10/1998 |
| JP | 2000322559 A | 11/2000 |
| JP | 2008040693 A | 2/2008 |

(Continued)

*Primary Examiner* — Utpal D Shah
(74) *Attorney, Agent, or Firm* — Cantor Colburn LLP

(57) ABSTRACT

A device for verifying a fingerprint includes: a sensing unit which captures a fingerprint image from a fingerprint of a user; a memory which stores a registered fingerprint image; and a controller which calculates a correlation coefficient between at least one region of the fingerprint image and the registered fingerprint image, and rotation-corrects the fingerprint image by a predetermined angle based on a result of comparing the correlation coefficient and a threshold value, where an area of the at least one region is within a range of about 5% to about 40% of an area of the fingerprint image.

20 Claims, 14 Drawing Sheets

(56) References Cited

U.S. PATENT DOCUMENTS

2017/0344804 A1* 11/2017 Zhou .................. G06K 9/00006

FOREIGN PATENT DOCUMENTS

| JP | 2010049379 A | 3/2010 |
|----|---|---|
| JP | 4911218 B2 | 1/2012 |
| KR | 100267262 B1 | 7/2000 |
| KR | 1007951870000 B1 | 1/2008 |
| KR | 1015372110000 B1 | 7/2015 |
| KR | 1020160133991 A | 11/2016 |

* cited by examiner

| A1 | A2 | A3 |
|---|---|---|
| B1 | B2 | B3 |
| C1 | C2 | C3 |

(b)

| A1 | A1 | A2 | A2 | A3 | A3 |
|---|---|---|---|---|---|
| A1 | A1 | A2 | A2 | A3 | A3 |
| B1 | B1 | B2 | B2 | B3 | B3 |
| B1 | B1 | B2 | B2 | B3 | B3 |
| C1 | C1 | C2 | C2 | C3 | C3 |
| C1 | C1 | C2 | C2 | C3 | C3 |

(c)

| A1 | A1' | A2 | A2' | A3 | A3' |
|---|---|---|---|---|---|
| A1 | A1' | A2 | A2' | A3 | A3' |
| B1 | B1' | B2 | B2' | B3 | B3' |
| B1 | B1' | B2 | B2' | B3 | B3' |
| C1 | C1' | C2 | C2' | C3 | C3' |
| C1 | C1' | C2 | C2' | C3 | C3' |

(d)

| A1 | A1' | A2 | A2' | A3 | A3' |
|---|---|---|---|---|---|
| $\frac{A1+B1}{2}$ | $\frac{A1'+B1'}{2}$ | $\frac{A2+B2}{2}$ | $\frac{A2'+B2'}{2}$ | $\frac{A3+B3}{2}$ | $\frac{A3'+B3'}{2}$ |
| B1 | B1' | B2 | B2' | B3 | B3' |
| $\frac{B1+C1}{2}$ | $\frac{B1'+C1'}{2}$ | $\frac{B2+C2}{2}$ | $\frac{B2'+C2'}{2}$ | $\frac{B3+C3}{2}$ | $\frac{B3'+C3'}{2}$ |
| C1 | C1' | C2 | C2' | C3 | C3' |
| $\frac{C1+D1}{2}$ | $\frac{C1'+D1'}{2}$ | $\frac{C2+D2}{2}$ | $\frac{C2'+D2'}{2}$ | $\frac{C3+D3}{2}$ | $\frac{C3'+D3'}{2}$ |

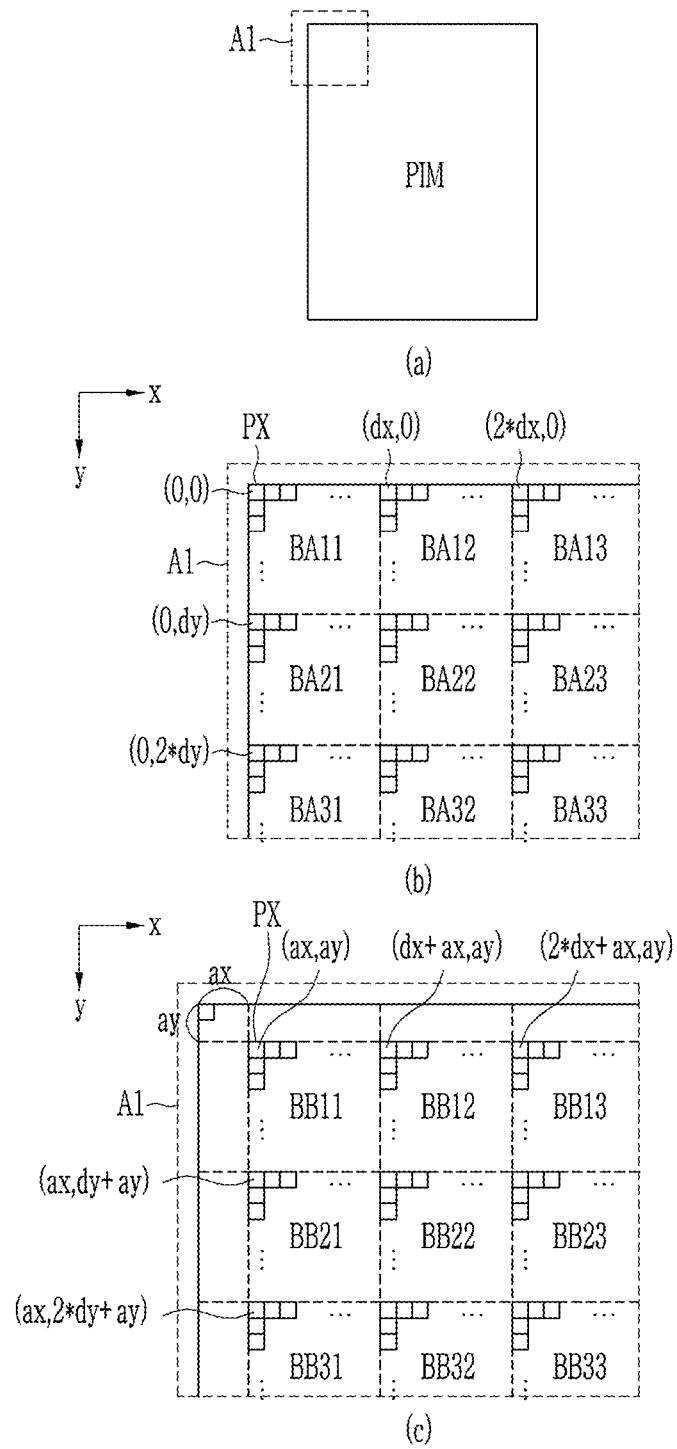

FIG. 10
 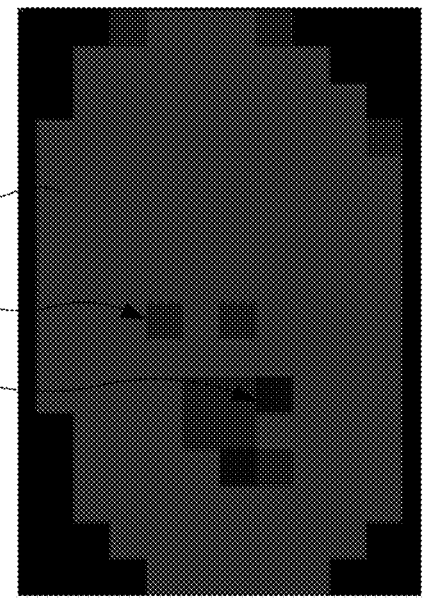
(a)             (b)

METHOD AND DEVICE FOR RECOGNIZING FINGERPRINT

This application claims priority to Korean Patent Application No. 10-2017-0024883, filed on Feb. 24, 2017, and all the benefits accruing therefrom under 35 U.S.C. § 119, the content of which in its entirety is herein incorporated by reference.

BACKGROUND (a) Field

The disclosure relates to a device for recognizing a fingerprint and a method for recognizing a fingerprint.

(b) Description of the Related Art

As various mobile devices and wearable devices have been developed recently, various functions utilizing personal information such as finance or security are provided therein, and thus, the importance on security verification increases.

A verification technique by biometrics verifies a user by using fingerprints, irises, voice, face, and blood vessels. The biometric characteristics used for verification are different for respective people, there is no inconvenience in possession, there is less risk of illegal uses or imitation, and they are not easily changed for life.

Particularly, the fingerprint verifying method is gradually becoming commercially available because of convenience, security, and economic feasibility. In a device using the fingerprint verifying method, a sensing unit for the fingerprint verifying method may directly or indirectly contact the finger of the user to recognize a fingerprint of the finger, and capture a fingerprint pattern as a fingerprint image.

SUMMARY

The exemplary embodiments have been made in an effort to provide a device for verifying a fingerprint for performing fingerprint verification by using a low-resolution fingerprint image, and a method for verifying a fingerprint.

The exemplary embodiments have been made in another effort to provide a device for verifying a fingerprint for performing accurate fingerprint verification by using a fingerprint image captured in various ways, and a method for verifying a fingerprint.

An exemplary embodiment of the invention provides a device for verifying a fingerprint, including: a sensing unit which captures a fingerprint image from a fingerprint of a user; a memory which stores a registered fingerprint image; and a controller which calculates a correlation coefficient between at least one region of the fingerprint image and the registered fingerprint image, and rotation-corrects the fingerprint image by a predetermined angle based on a result of comparing the correlation coefficient and a threshold value, where an area of the at least one region is within a range of about 5% to about 40% of an area of the fingerprint image.

In an exemplary embodiment, the controller may determine an overlapping region between the at least one region and the registered fingerprint image using a phase-only correlation ("POC"), and may correct a position of the at least one region of the registered image based on a result of determining the overlapping region.

In an exemplary embodiment, the controller may store a rotation angle and a correction position which allow a maximum correlation coefficient between the at least one region and the registered image in the memory.

In an exemplary embodiment, the controller may divide the fingerprint image into a plurality of blocks, and may calculate luminance deviations for each of the blocks to acquire weight coefficients of each of the blocks.

In an exemplary embodiment, the controller may detect at least one bifurcation of the fingerprint image as minutiae of the fingerprint image, and may determine whether the minutiae of the fingerprint image corresponds to minutiae of the registered fingerprint image.

In an exemplary embodiment, the controller may detect a distance between bifurcations, and may exclude at least one bifurcation from among the at least one bifurcation from the minutiae of the fingerprint image based on the detected distance.

In an exemplary embodiment, when determining whether the minutiae of the fingerprint image corresponds to the minutiae of the registered fingerprint image, the controller may calculate a matching degree between the minutiae of the fingerprint image and the minutiae of the registered fingerprint image based on the weight coefficient.

In an exemplary embodiment, the fingerprint image captured by the sensing unit may have a resolution that is less than 300 dots per inch (dpi).

In an exemplary embodiment, the controller may perform a high resolution process on the fingerprint image, may divide the high-resolution-processed fingerprint image into a plurality of sub-blocks, and may remove high frequency noise in the sub-blocks to generate a combined fingerprint image.

In an exemplary embodiment, the controller may average-process at least two combined fingerprint images generated by dividing the high-resolution-processed image with respect to different origins.

Another exemplary embodiment of the invention provides a method for verifying a fingerprint, including: capturing a fingerprint image from a fingerprint of a user using a sensing unit; reading a registered fingerprint image pre-stored in a memory; calculating a correlation coefficient between at least one region of the fingerprint image and the registered fingerprint image; and rotation-correcting the fingerprint image by a predetermined angle based on a result of comparing the correlation coefficient and a threshold value, where an area of the at least one region is within a range of about 5% to about 40% of an area of the fingerprint image.

In an exemplary embodiment, the method may further include, before the calculating the correlation coefficient, determining an overlapping region between the at least one region and the registered fingerprint image using a POC, and correcting a position of the at least one region on the registered image using a result of the determining the overlapping region.

In an exemplary embodiment, the method may further include, after the rotation-correcting, storing a rotation angle and a correction position which allow a maximum correlation coefficient between the at least one region and the registered image in the memory.

In an exemplary embodiment, the method may further include, after the storing the rotation angle and the correction position in the memory, dividing the fingerprint image into a plurality of blocks, and acquiring weight coefficients of each of the blocks by calculating luminance deviations of each of the blocks.

In an exemplary embodiment, the method may further include, after the storing the rotation angle and the correction position in the memory, detecting at least one bifurcation of the fingerprint image as minutiae of the fingerprint image, and determining whether the minutiae of the fingerprint image corresponds to minutiae of the registered fingerprint image.

In an exemplary embodiment, the method may further include, after the detecting the at least one bifurcation of the fingerprint image as minutiae of the fingerprint image, detecting a distance between the bifurcations, and excluding at least one bifurcation from among the at least one bifurcation from the minutiae of the fingerprint image based on the detected distance.

In an exemplary embodiment, the determining whether the minutiae of the fingerprint image corresponds to the minutiae of the registered fingerprint image may include calculating a matching degree between the minutiae of the fingerprint image and the minutiae of the registered fingerprint image based on the weight coefficient.

In an exemplary embodiment, the method may further include, before the calculating the correlation coefficient, performing a high resolution processing on the fingerprint image, dividing the high-resolution-processed fingerprint image into a plurality of sub-blocks, and generating a combined fingerprint image by removing high frequency noise in each of the sub-blocks.

In an exemplary embodiment, the method may further include, after the generating the combined fingerprint image, average-processing at least two combined fingerprint images generated by dividing the high-resolution-processed image with respect to different origins.

In an exemplary embodiment, the fingerprint image captured by the sensing unit may have resolution that is less than 300 dpi.

According to exemplary embodiments, fingerprint verification may be effectively performed for an image captured by a low-resolution sensing unit.

According to exemplary embodiments, fingerprint verification is rapidly and effectively performed by using a method set forth therein.

BRIEF DESCRIPTION OF THE DRAWINGS

The above and other features of the invention will become more apparent by describing in further detail exemplary embodiments thereof with reference to the accompanying drawings, in which:

FIG. 4 shows an example of high resolution processing of FIG. 3;

FIG. 5 shows an example of generating a combined image of FIG. 3;

FIG. 10 shows an example of a luminance deviation calculated after a sub-block division of FIG. 9;

DETAILED DESCRIPTION

Figure 1:
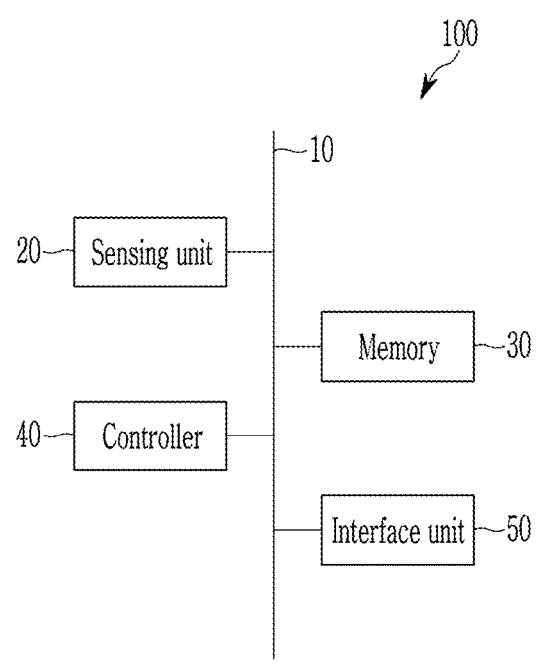
FIG. 1 shows a block diagram of a device for verifying a fingerprint according to an exemplary embodiment.

The invention will be described more fully hereinafter with reference to the accompanying drawings, in which exemplary embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another elements as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Exemplary embodiments to be described may be used to recognize a fingerprint of a user. An operation for recognizing a fingerprint of a user may include an operation for verifying or identifying the user by recognizing the fingerprint of the user. An operation for verifying a user may include an operation for determining whether the user is a registered user. In this case, a result of the operation for verifying a user may be output as true or false. An operation for identifying a user may include an operation for determining to which user from among a plurality of registered users the user corresponds. In this case, a result of the operation for identifying a user may be output as an identification ("ID") of one registered user. When the user does not correspond to any one of a plurality of users registered in advance, a signal for notifying that the user is not identified may be output.

The exemplary embodiments may be realized in various types of products such as desktop computers, laptop computers, tablet personal computers ("PC" s), smartphones, digital televisions ("TV" s), smart home appliances, smart vehicles, kiosks, and wearable devices. For example, the exemplary embodiments may be used to verify the user in smartphones, mobile devices, and smart home systems. The exemplary embodiments may be used for a payment service through user verification. Further, the exemplary embodiments may be applicable to the smart vehicle system for automatically starting a vehicle by verifying the user.

Hereinafter, exemplary embodiments of the invention will be described in detail with reference to accompanying drawings.

FIG. 1 shows a block diagram of a device 100 for verifying a fingerprint according to an exemplary embodiment.

As shown in FIG. 1, an exemplary embodiment of the device 100 for verifying a fingerprint or the fingerprint verifying device 100 may include a sensing unit 20, a memory 30, an interface unit 50, and a controller 40. The sensing unit 20, the memory 30, the interface unit 50, and the controller 40 may be connected to each other or communicate with each other through a bus 10.

The sensing unit 20 may capture an image of a fingerprint of a finger (or a toe) of a user. The sensing unit 20 may capture the fingerprint image by an optical method, a heat detecting method or a capacitive method, for example.

The sensing unit 20 may have a sensing region for sensing a fingerprint of the user. In an exemplary embodiment, the sensing region of the sensing unit 20 may be smaller than the fingerprint. In such an embodiment, the sensing unit 20 may sense part of the fingerprint through the sensing region.

The sensing unit 20 may generate a fingerprint image based on the sensed fingerprint. The fingerprint image may be used to register or recognize the fingerprint of the user.

When the sensing region of the sensing unit 20 is smaller than the fingerprint, the fingerprint image generated by the sensing unit 20 may be a partial image including part of the fingerprint. For better comprehension and ease of description, the image captured by the sensing unit 20 will be referred to as an original image. A resolution of the original image may be a low resolution image that is less than 300 dots per inch (dpi).

The memory 30 stores data for supporting various functions of the fingerprint verifying device 100. The memory 30 may store data and instructions for the operation of the fingerprint verifying device 100.

In an exemplary embodiment, the memory 30 registers and stores the fingerprint image. At least one of the original image captured by the sensing unit 20 and the modified image that is obtained by modifying the original image may be registered to the memory 30. The modified image may indicate an image that is generated when the original image is modified in a spatial domain, an image that is generated when the original image is modified in a frequency domain, or an image that is generated when the original image is modified in the spatial domain and the frequency domain. For better comprehension and ease of description, the modified image registered to the memory 30 will be referred to as a registered modified image.

In such an embodiment, the memory 30 may store characteristic information corresponding to the fingerprint images. In one exemplary embodiment, for example, the memory 30 may store an input modified image that is captured by the sensing unit 20 and is modified, a fingerprint image, an image matching result, and image feature information processed by the controller 40, and a score calculated by the controller 40. The memory 30 may be a volatile memory or a non-volatile memory.

The controller 40 may control at least one different constituent element of the fingerprint recognizing device or may perform various operations relating to data processing. In one exemplary embodiment, for example, the controller 40 may include at least one of a central processing unit ("CPU"), an application processor ("AP"), and a communication processor ("CP").

The controller 40 may generate a modified image by processing the fingerprint image captured from the sensing unit 20 according to a series of procedures, and may register and store the generated modified image in the memory 30.

In an exemplary embodiment, the controller 40 may perform user fingerprint verification based on the fingerprint image captured through the sensing unit 20. In an exemplary embodiment, the controller 40 may compare the registered modified image stored in the memory 30 and the captured fingerprint image, and may perform user (fingerprint) verification. A fingerprint verifying method by the controller 40 will be described later in detail with reference to FIG. 2.

The fingerprint recognizing device may be connected to an external device through the interface unit 50, and may exchange data with the external device. In one exemplary embodiment, for example, the interface unit 50 may transmit instructions or data input by the user or another external device to other constituent elements of the fingerprint recognizing device. In such an embodiment, the interface unit 50 may output the instructions or data received from other constituent elements of the fingerprint recognizing device to the user or another external device.

In an exemplary embodiment, at least some of the constituent elements of the fingerprint recognizing device may be operable in cooperation with each other to realize an operation and control of the fingerprint recognizing device according to a control method thereof. In an exemplary embodiment, the operation, the control or the control method of the fingerprint recognizing device may be realized on the fingerprint recognizing device by driving at least one application program stored in the memory 30.

Exemplary embodiments a fingerprint recognizing method that may be performed by a fingerprint recognizing device will now be described with reference to FIG. 2 to FIG. 14.

Figure 2:
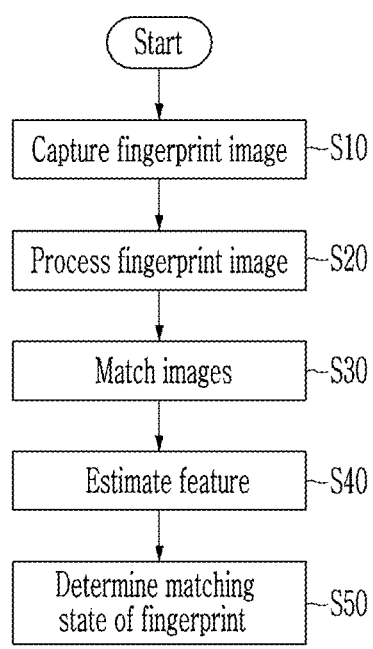
FIG. 2 shows a flowchart of a method for verifying a fingerprint according to an exemplary embodiment.

FIG. 2 shows a flowchart of a method for verifying a fingerprint according to an exemplary embodiment.

In an exemplary embodiment of a method for verifying a fingerprint, a fingerprint image is captured (S10). In one exemplary embodiment, for example, the sensing unit 20 captures a fingerprint image. The sensing unit 20 may sense the user's fingerprint through the sensing region to capture a fingerprint image (or an original image).

In such an embodiment, the fingerprint image or the original image is processed (S20). In an exemplary embodiment, the controller 40 image-processes the original image. The controller 40 may perform image processing for converting the original image into a high resolution image (hereinafter, "high resolution processing"), removing noise of the converted image, and averaging noise-removed images to process the noise-removed images into a single input modified image. The controller 40 may modify and process the original image into an image in a local binary pattern ("LBP") type, a histogram of oriented gradients ("HOG") type, a Haar feature type, a modified census transform ("MCT") type, an N-bit quantized type (here, N is an integer that is equal to or greater than 1) or a geographically warped type. However, the method for the controller 40 to image-process the original image is not limited thereto.

In an exemplary embodiment, the input modified image and the registered modified image are matched with each other (S30), and a feature of the input modified image and the registered modified image are estimated (S40). In an exemplary embodiment, the controller 40 matches the input modified image and the registered modified image, and estimates the feature of the input modified image and the registered modified image.

In an exemplary embodiment, whether the input modified image corresponds to the registered modified image is determined (S50). In an exemplary embodiment, the controller 40 uses a result of the image matching and a result of the feature estimation to determine whether the input modified image corresponds to the registered modified image. A user verification result or a user identification result may be deduced based on a result of determination on whether the input modified image corresponds to the registered modified image.

The image processing process (S20) of FIG. 2 will now be described in greater detail with reference to FIG. 3 to FIG. 6.

Figure 3:
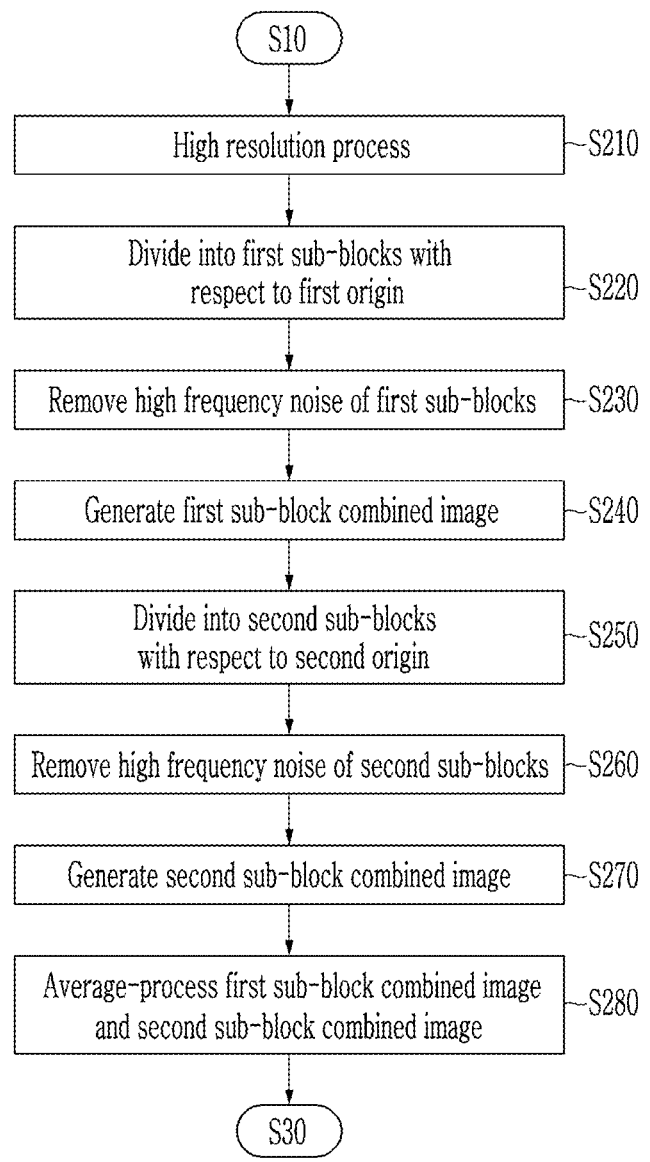
FIG. 3 shows a flowchart showing an exemplary embodiment of a process for processing a fingerprint image of FIG. 2.

FIG. 3 shows a flowchart showing an exemplary embodiment of a process for processing a fingerprint image of FIG. 2.

In an exemplary embodiment, the high-resolution processing is performed (S210). In an exemplary embodiment, the controller 40 high-resolution-processes the original image captured by the sensing unit 20. FIG. 4 will also be referred to in connection with the high resolution processing.

FIG. 4 shows an example of a high resolution processing of FIG. 3. The original image may be image data configured with M×N pixels. (a) of FIG. 4 is a schematic view of a part of a low-resolution original image. The part of the original image may include a 3×3 pixel array, and respective pixels may include luminance values (e.g., A1-A3, B1-B3, and C1-C3).

The controller 40 prepares a (2×M)×(2×N) pixel array. The controller 40 copies a luminance value of the pixel at the position (i, j) of the original image to the pixel at the position (2×i, 2×j) in the (2×M)×(2×N) pixel array, the pixel at the position (2×i+1, 2×j), the pixel at the position (2×i, 2×j+1), and the pixel at the position (2×i−1, 2×j+1). Here, i is an integer equal to or greater than 1, and less than M, and j is an integer equal to or greater than 1, and less than N. In an exemplary embodiment, the controller 40 may then convert the 3×3 pixel array into a 6×6 pixel array as shown by (b) of FIG. 4.

The controller 40 calculates an average luminance value for each pixel by shifting the pixel array of (b) of FIG. 4 to the right by one pixel and adding the pixel array of (b) of FIG. 4 to the shifted pixel array. The controller 40 may then configure the 6×6 pixel array as shown by (c) of FIG. 4. Here, A1' to A3', B1' to B3', and C1' to C3' may satisfy Equations 1 to 9, respectively, as shown below.

$$A1' = \frac{A1 + A2}{2} \qquad \text{(Equation 1)}$$

$$A2' = \frac{A2 + A3}{2} \qquad \text{(Equation 2)}$$

$$A3' = \frac{A3 + A4}{2} \qquad \text{(Equation 3)}$$

$$B1' = \frac{B1 + B2}{2} \qquad \text{(Equation 4)}$$

$$B2' = \frac{B2 + B3}{2} \qquad \text{(Equation 5)}$$

$$B3' = \frac{B3 + B4}{2} \qquad \text{(Equation 6)}$$

$$C1' = \frac{C1 + C2}{2} \qquad \text{(Equation 7)}$$

$$C2' = \frac{C2 + C3}{2} \qquad \text{(Equation 8)}$$

$$C3' = \frac{C3 + C4}{2} \qquad \text{(Equation 9)}$$

The controller 40 calculates an average luminance value for each pixel by shifting the pixel array of (c) of FIG. 4 upward by one pixel and adding the pixel array of (c) of FIG. 4 to the shifted pixel array. The controller 40 may then configure the 6×6 pixel array as shown by (d) of FIG. 4.

Referring back to FIG. 3, the high resolution processing image may be divided into sub-blocks with respect to a first origin of the high resolution processing image (S220). In an exemplary embodiment, the controller 40 divides the high resolution processing image into the sub-blocks with respect to the first origin of the high resolution processing image. The sub-blocks divided with reference to the first origin will be referred to as first sub-blocks.

In such an embodiment, high frequency noise of the first sub-blocks is removed (S230). In an exemplary embodiment, the controller 40 removes the high frequency noise of the first sub-blocks. The controller 40 may convert the respective sub-blocks into the frequency domain. Here, the frequency domain converting method includes a second-dimensional Fourier transform such as a fast Fourier transform ("FFT") or discrete Fourier transform ("DFT").

In an exemplary embodiment, the controller 40 may calculate a second-dimensionally Fourier transformed real part (Re) and an imaginary part (Im) for the each of respective first sub-blocks to acquire a spatial frequency characteristic of each of the respective first sub-blocks.

In general, a ridge of the fingerprint in the fingerprint image has a lower spatial frequency than the noise. To remove the noise, the controller 40 may remove a high frequency component by allowing the real part (Re) and the imaginary part (Im) to pass through a low pass filter ("LPF").

In an exemplary embodiment, the controller 40 may multiply the real part (Re) and the imaginary part (Im) of the low frequency component by a coefficient to emphasize a frequency peak. In an alternative exemplary embodiment, the controller 40 may multiply the real part (Re) and the imaginary part (Im) of the low frequency component by a square root of $Re^2+Im^2$ to emphasize the frequency peak. The controller 40 may inverse-Fourier-transform the emphasized real part (Re') and the imaginary part (Im'). The controller 40 may then acquire the ridge-emphasized image for each first sub-block.

In such an embodiment, a first sub-block combined image is generated (S240). In one exemplary embodiment, the controller 40 generates a first sub-block image by connecting the ridge-emphasized images of the respective first sub-blocks.

In such an embodiment, the high resolution processing image is divided into sub-blocks with respect to a second origin of the high resolution processing image (S250). In an exemplary embodiment, the controller 40 divides the high resolution processing image into the sub-blocks with respect to the second origin of the high resolution processing image. The sub-blocks divided with reference to the second origin will be referred to as second sub-blocks.

A process for dividing sub-blocks with reference to the first origin (S220) and a process for dividing sub-blocks with reference to the second origin (S250) will now be described in greater detail with reference to FIG. 5.

FIG. 5 shows an example of a sub-block division of FIG. 3. As shown by (a) of FIG. 5, an example for setting a first origin and a second origin in a first region A1 of an image PIM will now be described.

As shown by (b) of FIG. 5, in an exemplary embodiment, the controller 40 may set the pixel PX of (0, 0) as the first origin. The controller 40 may set (dx×dy)-numbered pixels (here, dx and dy are natural numbers) for respective sub-blocks with reference to the first origin. However, the invention is not limited thereto, and the controller 40 may set the respective sub-blocks by a random number of pixels. In such an embodiment, the sub-blocks may have shapes such as polygons including a triangle, a quadrangle and a hexagon, a circle, or an oval, but not being limited thereto. The shape of the sub-blocks may be variously modified.

In an exemplary embodiment, the controller 40 may set a quadrangular region having up to dx-numbered pixels (dx−1,0) in an x-axis direction as a first side and up to dy-numbered pixels (0,dy−1) in a y-axis direction as a second side to be one sub-block with respect to the first origin (0, 0). In such an embodiment, the first sub-block BA11 may include a pixel provided in a quadrangular region including a pixel of (0, 0), a pixel of (dx−1,0), a pixel of (0,dy−1), and a pixel of (dx−1, dy−1) as vertices.

In a like manner, the first sub-block BA12 provided near the first sub-block BA11 in the x-axis direction may include a pixel provided in a quadrangular region including a pixel of (dx,0), a pixel of (2dx−1,0), a pixel of (dx,dy−1), and a pixel of (2dx−1,dy−1) as vertices. The first sub-block BA21 provided near the first sub-block BA11 in the y-axis direction may include a pixel provided in a quadrangular region including a pixel of (0,dy), a pixel of (dx−1,dy), a pixel of (0,2dy−1), and a pixel of (dx−1,2dy−1) as vertices.

In such an embodiment, the controller 40 may divide the image PIM into the first sub-blocks (BA11-BA13, BA21-BA23, and BA31-BA33) with respect to the first origin (0, 0) in the process S220. The controller 40 may generate a first sub-block combined image by performing the processes S230 and S240.

In an exemplary embodiment, as shown by (c) of FIG. 5, the controller 40 may set the pixel PX of (ax,ay) as the second origin. In such an embodiment, the controller 40 may set the (dx×dy)-numbered pixels for respective sub-blocks with respect to the second origin. The controller 40 may differently set a form of the sub-blocks and the number of pixels included in the sub-blocks set in the processes S220 and S250.

In an exemplary embodiment, the controller 40 may set a quadrangular region having up to dx-numbered pixels (dx+ax−1,ay) in the x-axis direction as a first side and up to dy-numbered pixels (ax,dy+ay−1) in the y-axis direction as a second side to be one sub-block with respect to the second origin (ax,ay). In such an embodiment, the second sub-block BB11 may include a pixel provided in a quadrangular region including a pixel of (ax,ay), a pixel of (dx+ax−1,ay), a pixel of (ax,dy+ay−1), and a pixel of (dx+ax−1,dy+ay−1) as vertices.

In a like manner, the second sub-block BB12 provided near the second sub-block BB11 in the x-axis direction may include a pixel provided in a quadrangular region including a pixel of (dx+ax,ay), a pixel of (2dx+ax−1,ay), a pixel of (dx+ax,dy+ay−1), and a pixel of (2dx+ax−1,dy+ay−1) as vertices. The second sub-block BB21 provided near the second sub-block BB11 in the y-axis direction may include a pixel provided in a quadrangular region including a pixel of (ax,dy+ay), a pixel of (dx+ax−1,dy+ay), a pixel of (ax, 2dy+ay−1), and a pixel of (dx+ax−1,2dy+ay−1) as vertices.

In an exemplary embodiment, the controller 40 may divide the image PIM into the second sub-blocks (BB11-BB13, BB21-BB23, and BB31-BB33) with respect to the second origin (ax,ay) in the process S250, as described above. The controller 40 may generate a second sub-block combined image by performing the processes S260 and S270 in a like manner of the processes S230 and S240.

In such an embodiment, the controller 40 may, selectively, set a random pixel to be a third origin to divide the image PIM into sub-blocks, and may remove high frequency noise to generate a third sub-block combined image.

Referring back to FIG. 3, in an exemplary embodiment, average-processes are performed for the first and second sub-block combined images (S280). In an exemplary embodiment, the controller 40 average-processes the first and second sub-block combined images with respect to the first origin and the second origin. The average-processing of the process S280 will now be described in detail with reference to FIG. 6.

Figure 6:
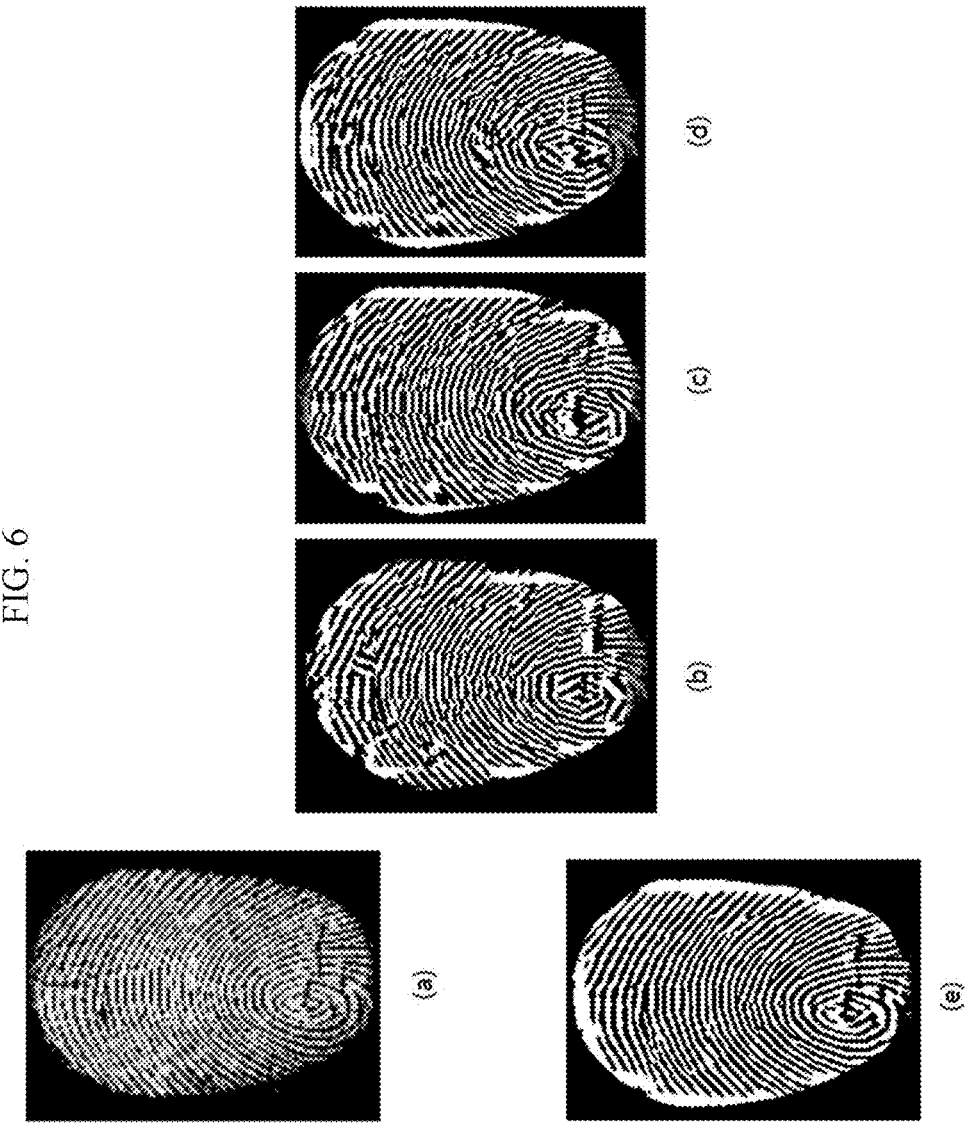
FIG. 6 shows an example of a fingerprint image in connection with an averaging process of FIG. 3.

FIG. 6 shows an example of a fingerprint image in connection with an averaging process of FIG. 3. (a) of FIG. 6 shows a high resolution processed image in the process S210.

(b), (c) and (d) of FIG. 6 show a sub-block combined image generated by the processes S220 to S270. In an exemplary embodiment, the ridges of an emphasized image may be dislocated from each other on a border of the sub-block. In such an embodiment, the ridges may be inconsecutive on the border of at least one sub-block of the emphasized image.

As shown by (e) of FIG. 6, the controller 40 may average-process (i.e., image-blend) the emphasized images. The averaging may be an arithmetic mean or average-processing (e.g., alpha-blending) in consideration of a weight coefficient. In such an embodiment, the average-processing does not have a limit on the number of combined images, and a smoother image may be generated as the number of combined image becomes greater.

Hereinafter, a process of image matching (S30) of FIG. 2 will be described in detail with reference to FIG. 7 and FIG. 8.

Figure 7:
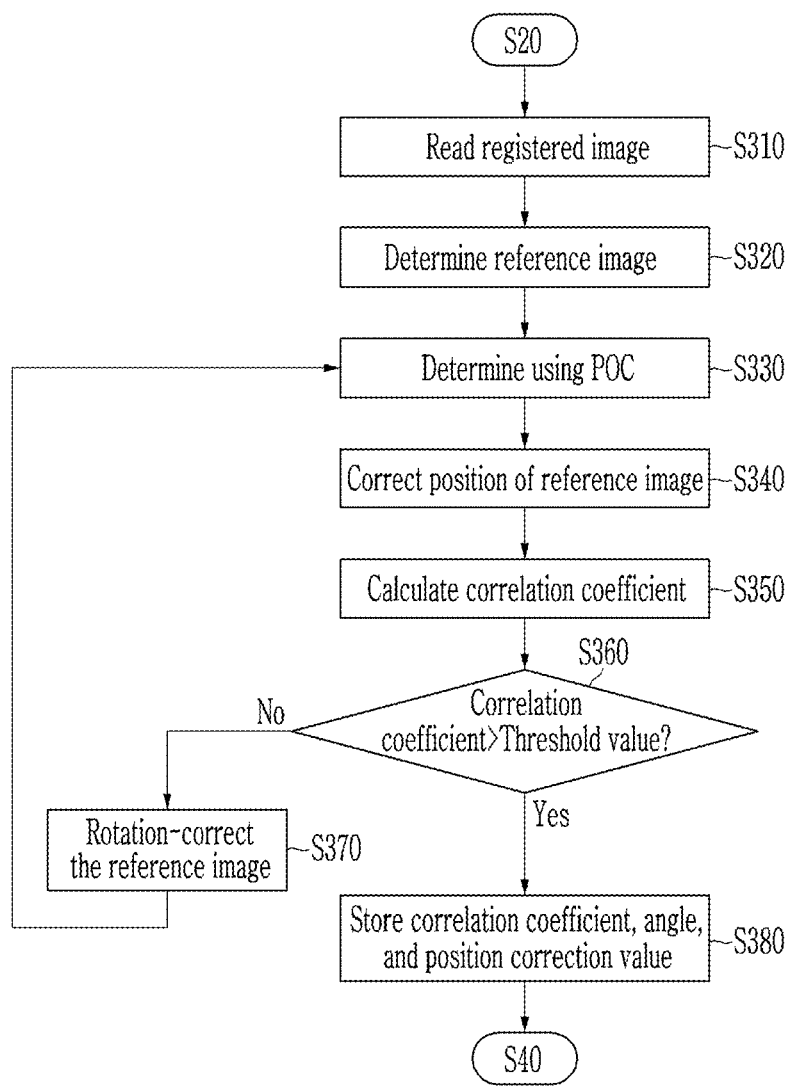
FIG. 7 shows a flowchart showing an exemplary embodiment of a process of image matching of FIG. 2.

FIG. 7 shows a flowchart showing an exemplary embodiment of a process of image matching of FIG. 2. In an exemplary embodiment, the controller 40 may image-match the registered modified image and the image average-processed from the captured fingerprint image.

According to an exemplary embodiment, the image matching represents a processing method for transforming different images and showing the transformed images on a coordinate system. How the different images correspond to each other may be found through the image matching.

In such an embodiment, as shown in FIG. 7, the registered images is read (S310). In an exemplary embodiment, the controller 40 reads a registered modified image from the memory 30.

In such an embodiment, a reference image is determined (S320). In an exemplary embodiment, the controller 40 determines a part of an average-processed image to be the reference image. In such an embodiment, the controller 40 may determine the reference image in a way such that the part of the image determined to be the reference image may have a predetermined ratio of area of the entire image. In an exemplary embodiment, the controller 40 may determine the reference image so that the reference image may have an area in a range of about 5% to about 10% of the entire image area.

In such an embodiment, a determination is performed using a phase-only correlation ("POC") (S330). In an exemplary embodiment, the controller 40 uses POC to determine an overlapping region between the registered modified image and the reference image.

When a new image (e.g., a correlation intensity image) is generated by calculating a cross correlation value between phases of two images in a Fourier space, a portion (e.g., a peak with high correlation intensity) where a maximum value appears in the new image may represent a relative positional relationship between the two images. In an exemplary embodiment, the controller 40 specifies the highest correlation value of correlation intensity and a peak position of the correlation value as a two-dimensional positional relationship of the registered modified image and the reference image.

In an exemplary embodiment, the position of the reference image is corrected (S340). In an exemplary embodiment, the controller 40 corrects the position of the reference image based on a plurality of correlation values and a corresponding peak position In an exemplary embodiment, the controller 40 may parallel-shift the reference image so that a pattern of the reference image may correspond to a pattern of the registered modified image.

In an exemplary embodiment, a correlation coefficient is calculated (S350). In an exemplary embodiment, the controller 40 calculates the correlation coefficient showing a similarity degree of two images. In an exemplary embodiment, the controller 40 may use a zero-mean normalized cross correlation ("ZNCC") to indicate the degree of similarity (or similarity degree) of the reference image to the registered modified image as a correlation coefficient having a value of 0 to 1.

The controller 40 may compare brightness, edge components, and color coordinates of the two images, that is, the reference image and a region of the registered modified image determined to overlap the reference image, and may normalize the reference image and the overlapping region of the registered modified image with the reference image to express the correlation degrees as one of values of 0 to 1. The controller 40 may determine that the similarity degree of two images is low when the correlation degree is close to 0, and it may determine that the two images are substantially the same as each other when the correlation degree is close to 1. The method for expressing the similarity of the image by use of the ZNCC is known to a person of ordinary skill in the image processing art, and detailed descriptions thereof will be omitted.

In an exemplary embodiment, it is determined whether the correlation coefficient exceeds a threshold value (S360). In an exemplary embodiment, the controller 40 determines whether the correlation coefficient exceeds the threshold value.

In an exemplary embodiment, the reference image is rotation-corrected when the correlation coefficient does not exceed the threshold value (S370). In an exemplary embodiment, the controller 40 rotation-corrects the reference image when the correlation coefficient does not exceed the threshold value. In such an embodiment, an angle for rotation-correcting the reference image may be set to be a random angle value. In one exemplary embodiment, for example, in the process S360, the controller 40 may rotation-correct the reference image by each of 5, 10 or 15 degrees in the clockwise direction.

The controller 40 may rotation-correct the reference image by using one angle value in a loop of the processes S330 to S370. In one exemplary embodiment, for example, in the process S370, the controller 40 may rotate the reference image by 10 degrees to correct the reference image.

In an exemplary embodiment, the controller 40 may use the POC to determine an overlapping region between the registered modified image and the corrected reference image (S330).

In such an embodiment, the controller 40 corrects the rotation angle of the reference image by gradually increasing (or reducing) the rotation angle based on a calculated correlation coefficient value. In such an embodiment, the processes S330 to S370 are repeatedly performed to correct the positional relationship and the rotation angle between the reference image and the registered modified image.

In an exemplary embodiment, a calculated correlation coefficient, a rotation angle correction value, and a position correction value (e.g., a parallel shifting value) are stored when the correlation coefficient exceeds the threshold value (S380). In an exemplary embodiment, the controller 40 stores the calculated correlation coefficient, the rotation angle correction value, and the position correction value when the correlation coefficient exceeds the threshold value. In such an embodiment, the controller 40 may store the correlation coefficient, the rotation angle correction value and a position correction value in connection with the average-processed image. In such an embodiment, the controller 40 may store the positional relationship having the maximum correlation coefficient between two images, and the rotation angle.

Figure 8:
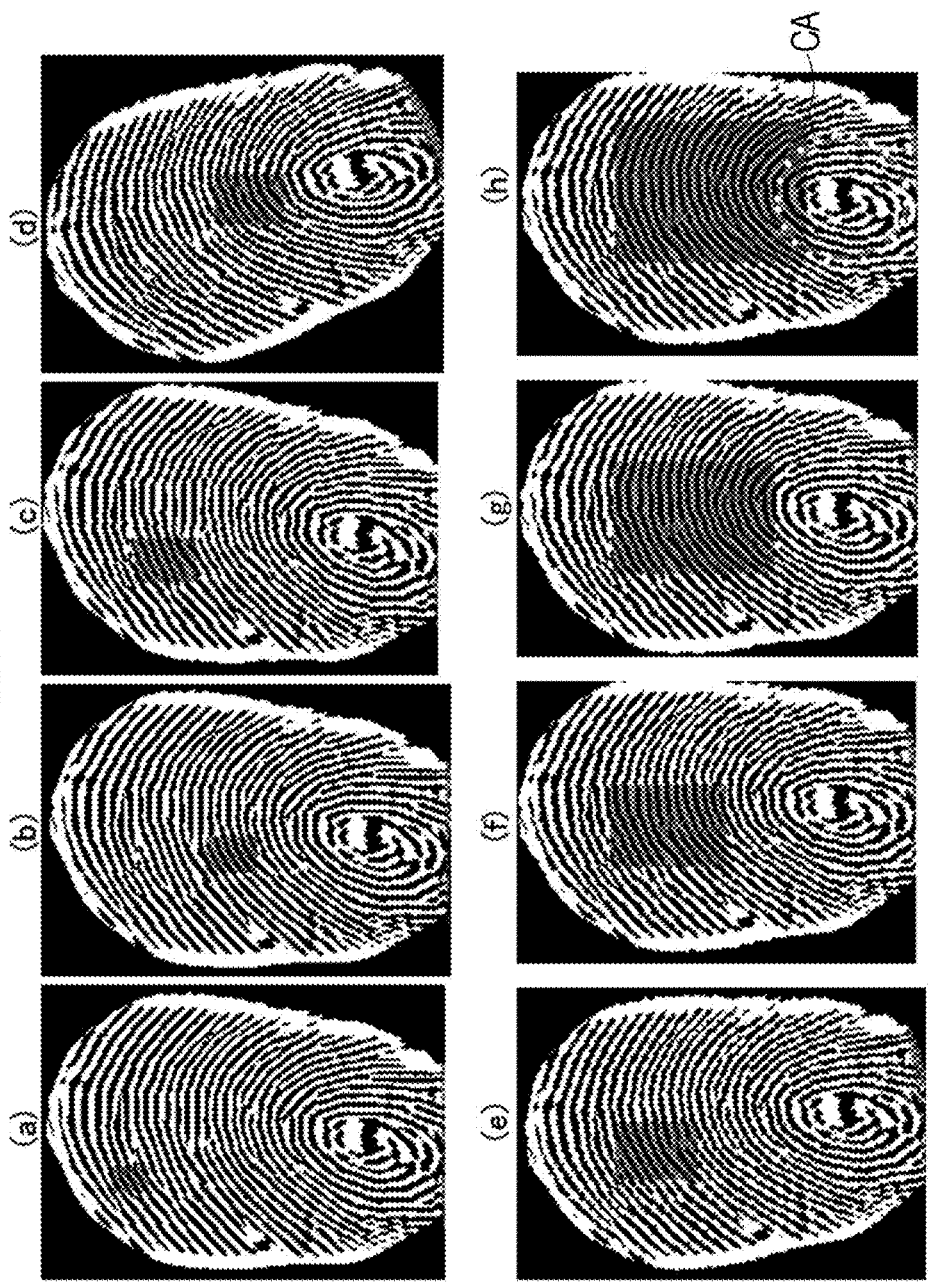
FIG. 8 shows an example of image matching according to ratio changes of a reference image for an entire image in FIG. 7.

FIG. 8 shows an example of image matching according to ratio changes of a reference image for an entire image in FIG. 7.

(a) to (d) of FIG. 8 show results of determining reference images by about 1%, about 2%, about 3% and about 4% of the area with respect to the entire image and performing image matching on the registered modified image.

As shown in FIG. 8, the position of the reference image with respect to the registered modified image, and the angle between the reference image and the registered modified image are different in (a) to (d).

(e) to (h) of FIG. 8 show results of determining reference images by about 5%, about 10%, about 20% and about 30% of the area with respect to the entire image and performing image matching on the registered modified image.

As show in FIG. 8, the position of the reference image with respect to the registered modified image, and the angle between the reference image and the registered modified image are the same for each of (e) to (h). Therefore, to increase the image matching property, the reference image may include a region that has an area ratio that is greater than about 5% for the entire average-processed image.

When the area ratio of the reference image exceeds about 40% for the entire image, the reference image may be determined by including a core area CA of the entire image. The ridge pattern of the core area CA may not be clear. Therefore, the reference image may include a region that has an area ratio that is less than about 40% for the entire average-processed image to have the region excluding the core area as a reference region.

The process S40 for estimating a feature of FIG. 2 will now be described in detail with reference to FIG. 9 to FIG. 12.

Figure 9:
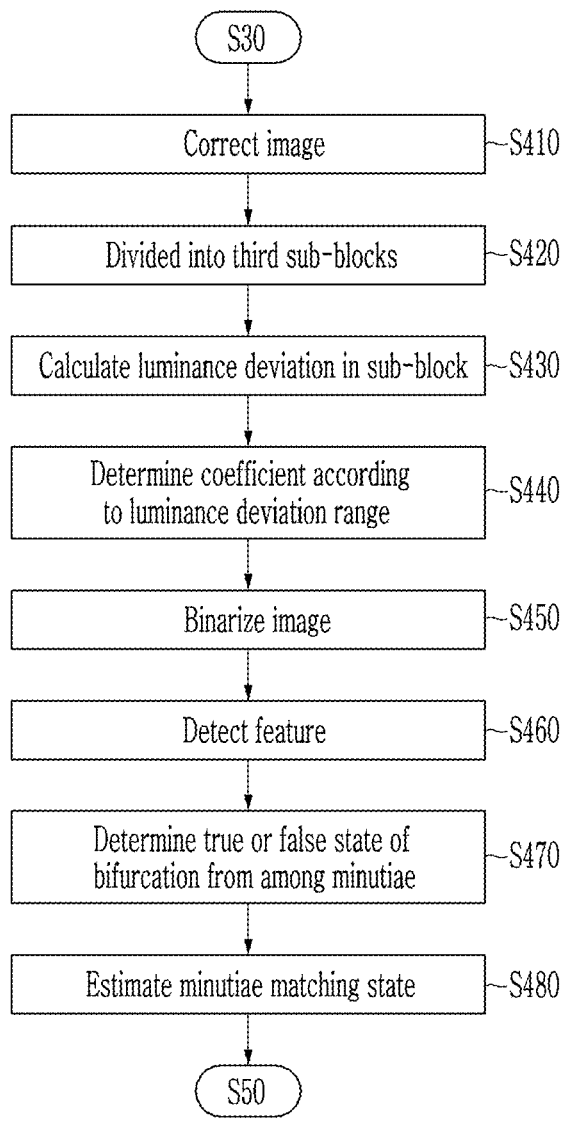
FIG. 9 shows a flowchart showing an exemplary embodiment of an exemplary embodiment of a process for estimating a feature of FIG. 2.

FIG. 9 shows a flowchart of an exemplary embodiment of a process for estimating a feature of FIG. 2. In such an embodiment, as shown in FIG. 9, the average-processed image is corrected (S410). In an exemplary embodiment, the controller 40 corrects the average-processed image by using a rotation angle correction value and a position correction value. In such an embodiment, the controller 40 may rotation-process the average-processed image by using the rotation angle correction value, and may parallel-shift-process the rotation-processed image by using the position correction value. In an alternative exemplary embodiment, the controller 40 may parallel-shift-process the average-processed image by using the position correction value, and may rotation-process the parallel-shift-processed image by using the rotation angle correction value.

In an exemplary embodiment, the corrected image is divided into sub-blocks (S420). In an exemplary embodiment, the controller 40 divides the corrected image into sub-blocks. The controller 40 may set the (m×n)-numbered (here m and n are natural numbers) pixels by respective sub-blocks. The sub-blocks of FIG. 9 may be the same as or different from the sub-blocks described above with reference to FIG. 5.

In an exemplary embodiment, a pixel luminance deviation in the respective sub-blocks is calculated (S430). In an exemplary embodiment, the controller 40 calculates the pixel luminance deviation in the respective sub-blocks. In such an embodiment, the controller 40 may calculate a luminance average of pixels provided in the sub-block. The controller 40 calculates a difference between the luminance average and the luminance of respective pixels in the sub-block, and calculates the average of absolute values of respective differences as a luminance deviation value.

In an exemplary embodiment, a weight coefficient is determined for each sub-block according to the range in which the luminance deviation value is included (S440). In an exemplary embodiment, the controller 40 determines a weight coefficient for each sub-block according to the range in which the luminance deviation value is included. In an exemplary embodiment, the controller 40 determines the weight coefficient that corresponds to the corresponding sub-block to be 0.5 when the luminance deviation value is equal to or greater than 0 and is less than a (a>0) (1), the controller 40 determines the weight coefficient to be 1 when the luminance deviation value is equal to or greater than a and is less than b (b>a>0) (2), and the controller 40 determines the weight coefficient to be 2 when the luminance deviation value is equal to or greater than b (3).

The processes S420 to S440 will now be described with reference to FIG. 10.

FIG. 10 shows an example of a luminance deviation calculated after a sub-block division of FIG. 9.

(a) of FIG. 10 shows an original image, and (b) of FIG. 10 shows a schematic view of a weight coefficient corresponding to the original image for each sub-block. The sub-blocks in (b) of FIG. 10 respectively have at least one of three weight coefficients W1, W2 and W3.

As shown in FIG. 10, sub-blocks with a lesser luminance deviation value are distributed in the region corresponding to the core area CA of (a). In the case of the core area CA, the pattern of ridges may not be clearly recognized, so pixels with high luminance may be provided on average. Therefore, the sub-block corresponding to the core area CA has a tendency of being determined with the weight coefficient W3 or the weight coefficient W2 that respectively have a relatively small value.

The ridge is relatively clearly recognized in the region except for the core area CA, so the luminance deviation among the pixels in the sub-block provided in the region except for the core area CA has a tendency of becoming big. Therefore, the sub-block provided in the region except for the core area CA is determined to be the weight coefficient W1 with a relatively high value. That is, a higher weight coefficient may be assigned when the feature provided in the region (i.e., a region with high reliability) where the ridge is relatively clearly recognized is estimated.

A matching state of the features may be estimated based on the weight coefficient of the sub-block where each feature is provided in the subsequent process for estimating a feature, according to the weight coefficients determined with different values.

Referring back to FIG. 9, in an exemplary embodiment, binarization is performed on the image (S450). In an exemplary embodiment, the controller 40 performs binarization on the image. The binarization represents changing the pixels with luminance that is greater than a threshold value into a maximum luminance value (e.g., 1 when expressed as a 1-bit binarized image), and changing the pixels with luminance that is equal to or less than the threshold value into a minimum luminance value (e.g., 0 when expressed as a 1-bit binarized image). The image binarization method is known to a person of ordinary skill in the image processing art, and detailed descriptions thereof will be omitted.

In an exemplary embodiment, a feature is detected (S460). In an exemplary embodiment, the controller 40 detects the feature from the binarized image. The binarized image may have a feature of the fingerprint, that is, a minutiae that is a precise feature such as a ridge end or a bifurcation.

In an exemplary embodiment, a true or false state of the bifurcation is determined from among the detected minutiae (S470). In an exemplary embodiment, the controller 40 determines the true or false state of the bifurcation from among the detected minutiae. When a resolution of the original image is low, adjacent ridges may not be completely separated from each other but may be connected to each other by noise. In this case, a point connected by noise (hereinafter, a false bifurcation) may be detected as a bifurcation, so the controller 40 may determine a true or false state for the respective bifurcations.

The false bifurcation is formed by noise, so a distance between false bifurcations is less than a distance between true bifurcations. A method for determining a true or false state of the minutiae in consideration of the above-noted characteristic will now be described with reference to FIG. 11 and FIG. 12.

Figure 11:
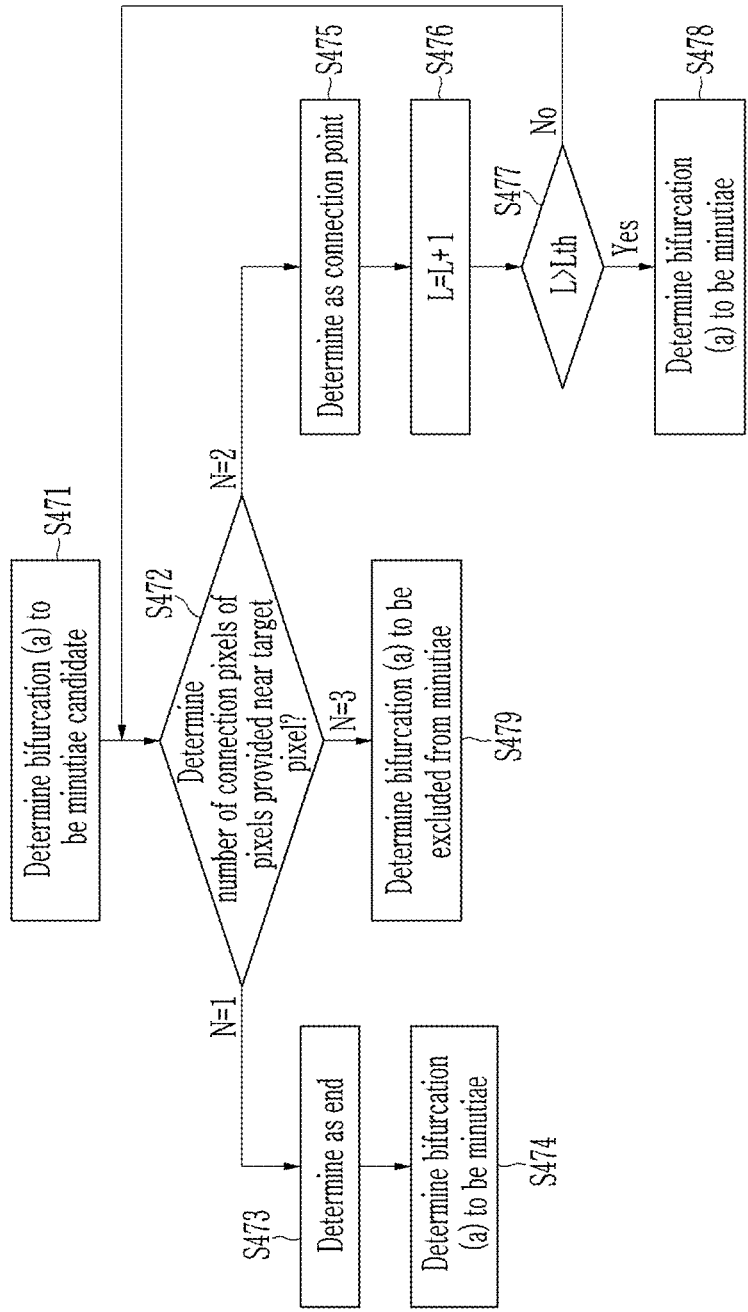
FIG. 11 shows a detailed flowchart showing an exemplary embodiment of a process for determining whether a feature state is true or false in FIG. 9.
Figure 12:
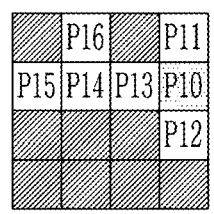
FIG. 12 and FIG. 13 show examples for determining whether a bifurcation is a feature according to a method of FIG. 11.
Figure 13:
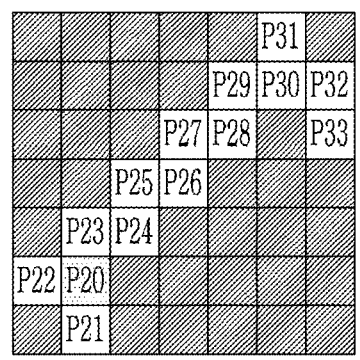

FIG. 11 shows a flowchart showing an exemplary embodiment of a process for determining whether a feature is true or false in FIG. 9, and FIG. 12 and FIG. 13 show examples for determining whether a bifurcation is a feature according to a method of FIG. 11.

One pixel may be connected to adjacent pixels in four directions (up, down, right and left). A bifurcation is a point connected to adjacent pixels in three directions, an end is a point connected to an adjacent pixel in one direction, and a connection point is a point connected to adjacent pixels in two directions.

As shown in FIG. 11, in an exemplary embodiment, a bifurcation (a) is determined to be a minutiae candidate (S471). In an exemplary embodiment, the controller 40 determines one bifurcation (a) of bifurcations to be a minutiae candidate (S471). As shown in FIG. 12 and FIG. 13, the bifurcation (P10 of FIG. 12, and P20 of FIG. 13) is determined to be a minutiae candidate in the binarized image.

In such an embodiment, the number of connection pixels of pixels provided near a target pixel is determined (S472). In an exemplary embodiment, the controller 40 determines the number of connection pixels of pixels provided near the target pixel (the bifurcation (a)). In such an embodiment, the controller 40 determines whether a pixel provided near the bifurcation (a) is an end, a connection point, or a bifurcation with reference to the bifurcation (a).

To determine whether the pixel provided near is an end, a connection point or a bifurcation, the controller 40 determines in how many directions the pixel provided near is connected to the adjacent pixels.

In an exemplary embodiment, as shown in FIG. 12, the controller 40 determines in how many directions the pixel provided near the pixel P10 is connected to the adjacent pixels. In such an embodiment, the controller 40 may determine in how many directions the pixel P13 provided on the left of the pixel P10, the pixel P11 on the upper side, and the pixel P12 on the lower side are connected to the adjacent pixels.

In an exemplary embodiment, referring to FIG. 13, the controller 40 may determine in how many directions the pixel P23 on the upper side of the pixel P20, the pixel P22 on the left side, and the pixel P21 on the lower side are connected to the adjacent pixels.

In such an embodiment, when a pixel provided near the target pixel is connected to the adjacent pixel in one direction, the pixel provided near the target pixel is determined to be the end (S473), e.g., by the controller 40. In one exemplary embodiment, for example, referring to FIG. 12, the pixel to which the pixel P12 provided on the lower side of the pixel P10 is connected is the pixel P10. The pixel P12 provided on the lower side of the pixel P10 is connected to the adjacent pixel P10 in one direction, so the pixel P12 is determined to be the end.

When the end exists near the target pixel (bifurcation (a)), that is, when the process S472 is performed on the bifurcation (a), and the processes S475 and S479 are not performed, no other bifurcations exist near the target pixel (bifurcation (a)) and the corresponding target pixel (bifurcation (a)) is determined to be a minutiae (S474), e.g., by the controller 40.

In such an embodiment, when three pixels are connected to the pixel provided near the target pixel (bifurcation (a)), the target pixel (bifurcation (a)) is determined to be excluded from the minutiae (S479), e.g., by the controller 40. No other bifurcations exist near the target pixel (bifurcation (a)), so the controller 40 determines the target pixel (bifurcation (a)) to be a false bifurcation.

In such an embodiment, when the pixel provided near the target pixel (bifurcation (a)) is connected to the adjacent pixels in two directions, the pixel provided near is determined to be the connection point (S475), e.g., by the controller 40.

In one exemplary embodiment, for example, referring to FIG. 12, the pixel P13 on the left side of the pixel P10 is connected to the pixel P10 and the pixel P14. The pixel P13 on the left side of the pixel P10 is connected to the adjacent pixels P10 and P12 in two directions, so the pixel P13 is determined to be a connection point.

The connection point is a point for connecting a pixel to a pixel, and the bifurcation (a) may be connected to another bifurcation through the connection point. Therefore, to determine whether another bifurcation is provided near the connection point, it is desired to be determined whether the pixels provided near the connection point are an end, a connection point, or a bifurcation. That is, after the process S476 and the process S477, the connection point may be set to be the target pixel of the process S472. In this case, the pixels provided near the connection point are separated from the bifurcation (a) by one pixel by the connection point.

Therefore, a distance (L) value is increased by one pixel (S476), e.g., by the controller 40. Here, the distance (L) represents a distance between the pixel (the pixel provided near the target pixel) of which the number of connection pixels will be determined and the bifurcation (a), and an initial value is set to be 1.

Then, as shown in FIG. 11, it is determined whether the distance (L) value exceeds a threshold value (Lth) (S478).

When the distance (L) value does not exceed the threshold value (Lth), the controller 40 determines the number of connection pixels of the pixels provided near the target pixel (connection point) (S472). The controller 40 may respectively determine the pixel provided near the target pixel (or the connection point) to be an end, a bifurcation, or a connection point according to the number of connection pixels (S473, S479, and S475). When the pixel provided near the target pixel (connection point) is determined to be an end, the bifurcation (a) may be determined to be minutiae. When the pixel provided near the target pixel (connection point) is a bifurcation, it may be determined to exclude the bifurcation (a) from the minutiae (S479). In such an embodiment, when the pixel provided near the target pixel (connection point) is a connection point, the distance (L) value is increased (S476) and is compared to the threshold value (S477).

In one exemplary embodiment, for example, as shown in FIG. 12, the pixel P14 or the pixel P10 is provided near the connection point pixel P13 with reference to the connection point pixel P13 provided on the left side of the pixel P10. The controller 40 determines whether the pixels P14 and P10 provided near the connection point pixel P13 are an end, a connection point, or a bifurcation. The pixel P10 is a minutiae candidate pixel so the pixel P10 is not evaluated.

The controller 40 may determine whether the pixel P14 is an end, a connection point, or a bifurcation. The pixel P14 is connected to the adjacent pixels P13, P15 and P16 in three directions, so the pixel P14 is determined to be a bifurcation. Therefore, the controller 40 determines the bifurcation (a) to be excluded from the minutiae (S479).

In an alternative exemplary embodiment, as shown in FIG. 13, the controller 40 determines whether the pixel provided near the connection point pixel P23 is an end, a connection point, or a bifurcation with reference to the connection point pixel P23 provided on the upper side of the pixel P20. The pixel provided near the connection point pixel P23 is the pixel P20 or the pixel P24. The pixel P20 is a minutiae candidate pixel, so the pixel P20 is not evaluated. The controller 40 determines whether the pixel P24 is an end, a connection point, or a bifurcation. The pixel P24 is connected to the adjacent pixels P23 and P25 in two directions, so the controller 40 determines the pixel P24 to be a connection point (S475).

The controller 40 increases the distance (L) value (S476) and determines whether the distance (L) value exceeds the threshold value (Lth). It is assumed in FIG. 13 that the threshold value is 7. The controller 40 may sequentially perform the processes S472 to S477 on the pixel P25, the pixel P26, the pixel P27, the pixel P28 and the pixel P29. When the process S477 is performed on the pixel P29, the distance (L) value exceeds the threshold value (Lth=7) so the controller 40 may determine the bifurcation (a) to be a minutiae. That is, the controller 40 may determine the bifurcation (a) to be minutiae when there are no other bifurcations within a predetermined distance from the bifurcation (a).

In an exemplary embodiment, as described above, the controller 40 may determine whether to exclude the respective bifurcations from the minutiae.

Referring back to FIG. 9, a matching state of the minutiae is estimated (S480). In an exemplary embodiment, the controller 40 estimates the matching state of the minutiae. The controller 40 may determine whether the minutiae of the registered modified image corresponds to the minutiae of the corrected image by using minutiae information of the registered modified image stored in the memory 30.

The controller 40 may estimate a minutiae matching state by considering a weight coefficient of the sub-block in which a plurality of corresponding minutiae are provided in two images, a state of whether kinds of a plurality of corresponding minutiae correspond, a distance between a plurality of corresponding minutiae, and an angle between vectors of a plurality of corresponding minutiae (S480).

In one exemplary embodiment, for example, the controller 40 may calculate a minutiae matching degree of two images with a mean value of a value generated by multiplying the weight coefficient, the matching degree of the types, the distance, and the angle for each minutiae.

Estimation on a matching state of minutiae will now be described with reference to FIG. 14.

Figure 14:
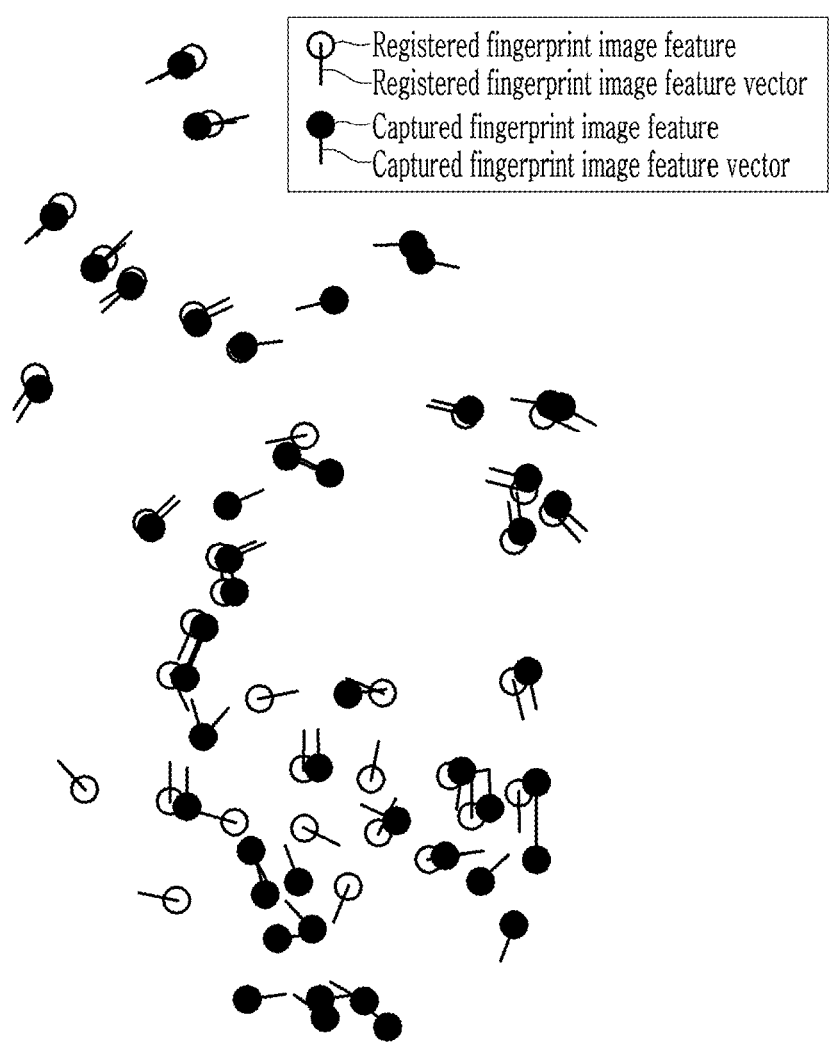
FIG. 14 shows an example for estimating whether a feature of FIG. 9 matches or not.

FIG. 14 shows an example for estimating whether a feature of FIG. 9 matches or not. In an exemplary embodiment, as shown in FIG. 14, the controller 40 may estimate by what degree the positions of minutiae of the registered modified image, vectors of the respective minutiae, positions of the minutiae of the captured corrected image, and vectors of respective minutiae correspond to each other.

Therefore, the controller 40 may determine whether the input modified image corresponds to the registered modified image by using the correlation coefficient calculated by the image matching and the minutiae matching degree.

The case of recognizing the user using a part of the fingerprint of the user has been described, and exemplary embodiments may be applicable to the case of recognizing the user using a part of biometric data of the user. Here, the biometric data may include information on the fingerprint of the user, information on a blood vessel, and information on an iris. In an exemplary embodiment, the controller 40 may receive input data corresponding to part of the biometric data of the user from the sensing unit 20, may modify the input data into a modified image, may compare the modified images and registered modified data corresponding to partial data of the registered biometric data, and may recognize the user based on a comparison result.

In one exemplary embodiment, for example, the sensing unit 20 may include a sensor for recognizing a blood vessel pattern of the user. The sensing unit 20 may extract a blood vessel pattern from skin on a back of a hand of the user. The sensing unit 20 may maximize a brightness contrast of blood vessels for the skin by using an infrared lighting and a filter, and may capture an image including a blood vessel pattern. In such an embodiment, the sensing unit 20 may capture a modified image generated by modifying the blood vessel pattern. In such an embodiment, the controller 40 may recognize the user by comparing the modified image corresponding to part of the blood vessel pattern and the modified images of a registered blood vessel pattern.

In an alternative exemplary embodiment, the sensing unit 20 may include a sensor for recognizing an iris pattern of the user. The sensing unit 20 may scan or capture an iris pattern between a pupil and a sclera (a white area of the eye) of the user. In such an embodiment, the sensing unit 20 may capture a modified image generated by modifying the iris pattern. In such an embodiment, the controller 40 may recognize the user by comparing the modified image corresponding to part of the iris pattern and the modified images of a registered iris pattern.

The above-described device may be realized by hardware constituent elements, software constituent elements, and/or a combination of hardware constituent elements and software constituent elements. In one exemplary embodiment, for example, the device and constituent elements described herein may be realized by using at least one general-purpose computer or a specific-purpose computer like a processor, a controller, an arithmetic logic unit ("ALU"), a digital signal processor, a microcomputer, a field programmable array ("FPA"), a programmable logic unit ("FLU"), a microprocessor, or a device for performing instructions and making responses. A processing device may perform at least one software application on an operating system ("OS"). Further, the processing device may access, store, manipulate, process, and generate data in response to the performance of software. For ease of understanding, a single processing device has been described to be used in some embodiment, but a person skilled in the art may know that the processing device includes a plurality of processing elements and/or a plurality of types of processing elements. In one exemplary embodiment, for example, the processing device may include a plurality of processors or one processor and one controller. Further, another processing configuration such as a parallel processor is available.

The software may include a computer program, a code, an instruction, and at least one combination thereof, it may configure the processing device so that the same may be operable as desired, or it may instruct the processing device independently or collectively. The software and/or the data may be permanently or temporally embodied to a certain type of machine, a component, a physical device, virtual equipment, a computer storage medium or device, or a transmitted signal wave so as to be analyzed by the processing device or so as to provide instructions or data to the processing device. The software may be distributed to a computer system connected through a network and may be stored or performed by a distributed method. The software and the data may be stored in at least one computer readable recording medium.

A method according to an exemplary embodiment of the invention may be realized in a program instruction format executable by various computer means, and may be recorded on a computer readable medium. The computer readable medium may include a program instruction, file data, and data structures, or combinations thereof. The program instruction recorded on the medium may be those that are designed and configured for the exemplary embodiment, or those that are known to a person of ordinary skill in the art of computer software and are usable. Examples of the computer readable medium include magnetic media such as a hard disk drive, a floppy disk, or a magnetic tape, optical media such as a CD-ROM or a DVD, magneto-optical media such as a floptical disk, and a hardware device specially configured to store and execute program instructions such as a ROM, a RAM, or a flash memory. Examples of the program instruction include high-level language codes executable by a computer by using an interpreter in addition to machine language codes generated by a compiler. The hardware device can be configured to be operable as at least one software module for performing an operation of the invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A device for verifying a fingerprint, the device comprising:
   a sensing unit which captures a fingerprint image from a fingerprint of a user;
   a memory which stores a registered fingerprint image; and
   a controller which calculates a correlation coefficient between at least one region of the fingerprint image and the registered fingerprint image, and rotation-corrects the fingerprint image by a predetermined angle based on a result of comparing the correlation coefficient and a threshold value,
   wherein an area of the at least one region is within a range of about 5% to about 40% of an area of the fingerprint image.

2. The device of claim 1, wherein
   the controller determines an overlapping region between the at least one region and the registered fingerprint image using a phase-only correlation, and
   the controller corrects a position of the at least one region of the registered image based on a result of determining the overlapping region.

3. The device of claim 2, wherein
   the controller stores a rotation angle and a correction position which allow a maximum correlation coefficient between the at least one region and the registered image in the memory.

4. The device of claim 3, wherein
   the controller divides the fingerprint image into a plurality of blocks, and
   the controller calculates luminance deviations for each of the blocks to acquire weight coefficients of each of the blocks.

5. The device of claim 4, wherein
   the controller detects at least one bifurcation of the fingerprint image as minutiae of the fingerprint image, and
   the controller determines whether the minutiae of the fingerprint image corresponds to minutiae of the registered fingerprint image.

6. The device of claim 5, wherein
   the controller detects a distance between bifurcations, and
   the controller excludes at least one bifurcation from among the at least one bifurcation from the minutiae of the fingerprint image based on the detected distance.

7. The device of claim 5, wherein
   when determining whether the minutiae of the fingerprint image corresponds to the minutiae of the registered fingerprint image, the controller calculates a matching degree between the minutiae of the fingerprint image and the minutiae of the registered fingerprint image based on the weight coefficient.

8. The device of claim 1, wherein
   the fingerprint image captured by the sensing unit has a resolution less than 300 dots per inch.

9. The device of claim 1, wherein
   the controller performs a high resolution process on the fingerprint image,
   the controller divides the high-resolution-processed fingerprint image into a plurality of sub-blocks, and
   the controller removes high frequency noise in the sub-blocks to generate a combined fingerprint image.

10. The device of claim 9, wherein
    the controller average-processes at least two combined fingerprint images generated by dividing the high-resolution-processed image with respect to different origins.

11. A method for verifying a fingerprint, the method comprising:
    capturing a fingerprint image from a fingerprint of a user using a sensing unit;
    reading a registered fingerprint image pre-stored in a memory;
    calculating a correlation coefficient between at least one region of the fingerprint image and the registered fingerprint image; and
    rotation-correcting the fingerprint image by a predetermined angle based on a result of comparing the correlation coefficient and a threshold value,
    wherein an area of the at least one region is within a range of about 5% to about 40% of an area of the fingerprint image.

12. The method of claim 11, further comprising:
    before the calculating the correlation coefficient, determining an overlapping region between the at least one region and the registered fingerprint image using a phase-only correlation, and correcting a position of the at least one region on the registered image using a result of the determining the overlapping region.

13. The method of claim 12, further comprising:

after the rotation-correcting, storing a rotation angle and a correction position which allow a maximum correlation coefficient between the at least one region and the registered image in the memory.

14. The method of claim 13, further comprising:

after the storing the rotation angle and the correction position in the memory, dividing the fingerprint image into a plurality of blocks, and acquiring weight coefficients of each of the blocks by calculating luminance deviations of each of the blocks.

15. The method of claim 14, further comprising:

after the storing the rotation angle and the correction position in the memory, detecting at least one bifurcation of the fingerprint image as minutiae of the fingerprint image, and determining whether the minutiae of the fingerprint image corresponds to minutiae of the registered fingerprint image.

16. The method of claim 15, further comprising:

after the detecting the at least one bifurcation of the fingerprint image as the minutiae of the fingerprint image, detecting a distance between the bifurcations, and excluding at least one bifurcation from among the at least one bifurcation from the minutiae of the fingerprint image based on the detected distance.

17. The method of claim 15, wherein the determining whether the minutiae of the fingerprint image corresponds to the minutiae of the registered fingerprint image comprises calculating a matching degree between the minutiae of the fingerprint image and the minutiae of the registered fingerprint image based on the weight coefficient.

18. The method of claim 11, further comprising:

before the calculating the correlation coefficient, high-resolution-processing on the fingerprint image;

dividing the high-resolution-processed fingerprint image into a plurality of sub-blocks; and generating a combined fingerprint image by removing high frequency noise in each of the sub-blocks.

19. The method of claim 18, further comprising:

after the generating the combined fingerprint image, average-processing at least two combined fingerprint images generated by dividing the high-resolution-processed image with respect to different origins.

20. The method of claim 11, wherein the captured fingerprint image has a resolution that is less than 300 dots per inch.

* * * * *